United States Patent
Ogura et al.

(10) Patent No.: US 8,836,537 B2
(45) Date of Patent: Sep. 16, 2014

(54) NOTIFICATION APPARATUS FOR VEHICLE

(71) Applicant: DENSO CORPORATION, Aichi (JP)

(72) Inventors: Nobuhiro Ogura, Handa (JP); Ryoichi Ijima, Nagoya (JP)

(73) Assignee: DENSO CORPORATION, Kariya (JP)

( * ) Notice: Subject to any disclaimer, the term of this patent is extended or adjusted under 35 U.S.C. 154(b) by 47 days.

(21) Appl. No.: 13/763,828

(22) Filed: Feb. 11, 2013

(65) Prior Publication Data

US 2013/0241748 A1 Sep. 19, 2013

(30) Foreign Application Priority Data

Mar. 16, 2012 (JP) .................................. 2012-60351

(51) Int. Cl.
*G08G 1/09* (2006.01)
*G01C 21/36* (2006.01)
*G08G 1/0962* (2006.01)
*G08G 1/0967* (2006.01)

(52) U.S. Cl.
CPC .......... *G08G 1/0967* (2013.01); *G01C 21/3697* (2013.01); *G08G 1/09626* (2013.01)
USPC ............................. 340/905; 340/933; 340/937

(58) Field of Classification Search
USPC ............... 340/905, 933, 937, 995.1; 701/408, 701/468, 533
See application file for complete search history.

(56) References Cited

U.S. PATENT DOCUMENTS 8,188,887 B2 * 5/2012 Catten et al. .................. 340/905
2012/0245838 A1 * 9/2012 Van Doorselaer ............ 701/408

FOREIGN PATENT DOCUMENTS

JP    A-2000-20891    1/2000
JP    2013-127710 A   6/2013

OTHER PUBLICATIONS

Japan Institute of Invention and Innovation Published Technical Document No. 2012-501222, Published Date: Mar. 9, 2012 (and partial translation).

* cited by examiner

*Primary Examiner* — Toan N Pham
(74) *Attorney, Agent, or Firm* — Posz Law Group, PLC (57) ABSTRACT

A notification apparatus for notifying a passenger in a vehicle of existence of a specific object disposed on a road includes: an information obtaining device that obtains positional information indicative of a position of each specific object and angle information indicative of a direction of each specific object; a candidate retrieving device that: sets an inclusive region including a driving schedule route; and retrieves one specific object in the inclusive region as a notification object candidate; a first eliminating device that eliminates the one specific object from the notification object candidate when the one specific object does not correspond to a driving direction; and a second eliminating device that eliminates the one specific object from the notification object candidate when the one specific object is not disposed on the driving schedule route.

10 Claims, 6 Drawing Sheets

|  |  | ROAD WIDTH | | | |
|---|---|---|---|---|---|
|  |  | 3.00m | 3.25m | 3.50m | ···m |
| NUM OF LANES | ONE LANE | α=0.3m | α=0.6m | α=0.9m | ···m |
|  | TWO LANES | α=0.6m | α=0.9m | α=1.2m | ···m |
|  | THREE LANES | α=0.9m | α=1.2m | α=1.5m | ···m |
|  | N LANES | ···m | ···m | ···m | ···m |

NOTIFICATION APPARATUS FOR VEHICLE

CROSS REFERENCE TO RELATED APPLICATION

This application is based on Japanese Patent Application No. 2012-60351 filed on Mar. 16, 2012, the disclosure of which is incorporated herein by reference.

TECHNICAL FIELD

The present disclosure relates to a notification apparatus for notifying a passenger in a vehicle of existence of a specific object arranged on a road.

BACKGROUND

Conventionally, when a vehicle approaches a speed camera, which is a speed monitor arranged on a road, a navigation apparatus notifies a passenger in a vehicle of existence of the speed camera. JP-A-2000-20891 teaches this navigation apparatus. This notification function is realized by embedding information about the speed camera into the map data.

Under a condition that an arrangement status (such as an arrangement place) of the speed camera is frequently changed, it is necessary to update the information about the speed camera frequently so that the navigation apparatus notifies the existence appropriately. However, it takes much time such as one year to update the map data. Further, it takes much cost to update the data. Accordingly, it is difficult to update the map data frequently.

Thus, it is considered that the map data and the information about the speed camera may be separated. When the information about the speed camera is independent from the map data, it may be possible to update the information about the speed camera frequently. However, it is necessary to search one of speed cameras as a notification object effectively among multiple speed cameras. Here, the navigation apparatus notifies the information about the speed camera. Alternatively, the apparatus may notify information about other objects disposed on the road.

SUMMARY

It is an object of the present disclosure to provide a notification apparatus for notifying a passenger in a vehicle of existence of a specific object arranged on a road. The notification apparatus searches the specific object as a notification object effectively based on information about the specific object, which is independent from map data.

According to an example aspect of the present disclosure, a notification apparatus for notifying a passenger in a vehicle of existence of a specific object disposed on a road includes: an information obtaining device that obtains information about a plurality of specific objects, the information including positional information indicative of a position of each specific object and angle information indicative of a direction of each specific object; a candidate retrieving device that: sets an inclusive region including a driving schedule route of the vehicle, which is specified by map data; and retrieves one of the specific objects in the inclusive region as a notification object candidate, according to the positional information; a first eliminating device that eliminates the one of the specific objects from the notification object candidate according to the angle information when the one of the specific objects does not correspond to a driving direction of the vehicle; and a second eliminating device that eliminates the one of the specific objects from the notification object candidate according to the positional information when the one of the specific objects is not disposed on the driving schedule route.

The above notification apparatus searches one of the specific objects as the notification object among multiple specific objects when the one of the specific objects is disposed on the driving schedule route and corresponds to the driving direction of the vehicle along the driving schedule route. Accordingly, the apparatus searches the notification object effectively according to the information about the specific objects, which is independent from the map data.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (1. Whole Constitution)

Figure 1:
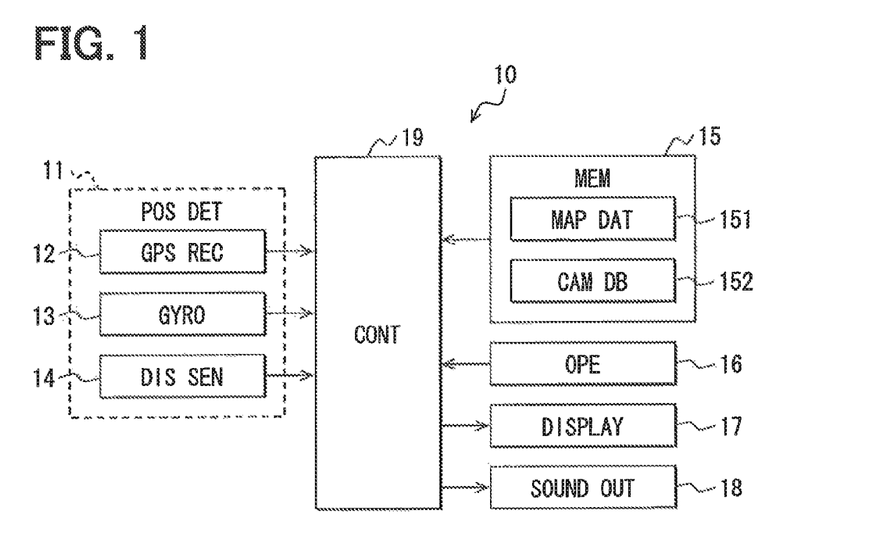
FIG. 1 is a block diagram showing a navigation apparatus.

As shown in FIG. 1, a navigation apparatus 10 according to an example embodiment is mounted on a vehicle. The apparatus 10 includes a position detector 11, a memory 15, an operation element 16, a display 17, a sound output element 18 and a controller 19.

The position detector 11 includes a GPS receiver 12, a gyroscope 13 and a distance sensor 14. The GPS receiver 12 receives a transmission signal from a GPS satellite for a GPS (global positioning system) so that the GPS receiver 12 detects a positional coordinates and an altitude of the vehicle. The gyroscope 13 outputs a detection signal corresponding to an angular speed of rotation applied to the vehicle. The distance sensor 14 outputs a driving distance of the vehicle. Based on output signals from these sensors, the controller 19 calculates the current position, an orientation, a vehicle speed and the like.

The memory 15 stores map data 151 and speed camera database 152, which are independently stored. Specifically, the map data 151 and the speed camera database 152 are independently updated and delivered. The memory 15 obtains various information from stored data and database, and then, the memory 15 outputs the various information to the controller 19.

The map data 151 includes road data indicative of road connection status, facility data indicative of facilities on the map, and guidance data for guiding a route. The road connection status is shown by a node and a link, which connects between nodes. Here, the node represents a branch point such as an intersection on a road, and an intermediate point, which is used for drawing a curve of the road. Further, the node is specified by an absolute position with using a longitude and a latitude.

The speed camera database 152 is provided by a database company of the speed camera. The speed camera database 152 stores positional information and angle information about multiple speed cameras as speed monitors arranged on roads. The positional information indicates the position of each speed camera, and the angle information indicates a direction of the speed camera. Here, the positional information is coordinate data indicative of an absolute position of an arrangement place of the camera, which is shown by the longitude and the latitude. The angle information is angle data indicative of an arrangement angle of the camera with respect to a reference direction such as a north direction. The arrangement angle is measured from the north in a clockwise rotation.

In the present embodiment, the position of the speed camera viewing from an object of the camera disposed at the front of the camera is defined as the arrangement direction of the camera. For example, when the object of the camera is located directly south of the camera, the arrangement angle of the camera for shooting the object is zero degree. When the object of the camera is located directly west of the camera, the arrangement angle of the camera for shooting the object is 90 degrees. Specifically, the driving direction of the vehicle is defined as an angle between a reference direction and the driving direction in a certain rotation. In the present embodiment, the reference direction is the north direction, and the certain rotation is the clockwise rotation. The driving direction of the vehicle coincides with the arrangement angle of the speed camera for shooting the vehicle, which runs along the driving direction. For example, when the vehicle runs toward the true north, i.e., when the vehicle runs with the driving direction of zero degree, the speed camera for shooting the vehicle has the suitable arrangement angle of zero degree. When the vehicle runs toward the true east, i.e., when the vehicle runs with the driving direction of 90 degrees, the speed camera for shooting the vehicle has the suitable arrangement angle of 90 degrees.

The controller 16 inputs various instructions from a user of the navigation apparatus 10. The instructions include an instruction for setting a condition and an instruction for executing a function. The input of the instructions is performed by a tough panel arranged on a display screen of the display 17 and/or a mechanical switch.

The display 17 includes a display screen such as a liquid crystal display. The display 17 displays various information on the screen in accordance with the input of an image signal from the controller 19. The display 17 displays a map image, a guidance route as a guiding pass from the guidance starting point to the destination, a mark indicative of the current position of the vehicle, and other guidance information.

The sound output element 18 outputs a sound providing various information. For example, the sound includes a voice message and a warning sound. Thus, the apparatus 10 performs various route guidance to the user through the image displayed on the display 17 and the sound output from the element 18.

The controller 19 includes a conventional micro computer having a CPU, a ROM, a RAM, an I/O element and a bus line, which connected among the CPU, the ROM, the RAM and the I/O element. The CPU executes various processes according to a program stored in the ROM based on the information input from the position detector 11, the memory 15 and the controller 16.

(2. Overview of Process)

Next, the process executed by the navigation apparatus 10 will be explained. The apparatus 10 has a camera warning function for preliminary notifying a passenger in the vehicle such as a driver of the vehicle of existence of the camera disposed at a point the road, which the vehicle is to reach. For example, the apparatus notifies the driver of existence of the camera a few hundreds meters behind the camera. Specifically, when the vehicle approaches the speed camera, the display 17 displays the warning icon, and the sound output element 18 outputs the warning sound.

Figure 2:
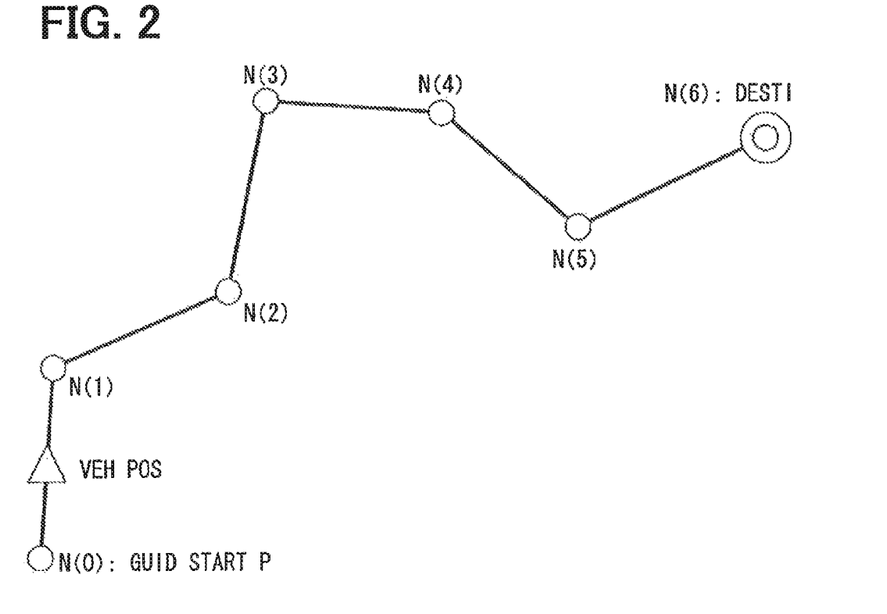
FIG. 2 is a diagram showing an example of a guiding route.

To realize the camera warning function, the navigation apparatus 10 executes the following speed camera searching process. The apparatus 10 executes the speed camera searching process after the apparatus specifies the guidance route on the map data from the guidance starting point to the destination, i.e., after the route searching process. As shown in FIG. 2, the guidance route from the guidance starting point as the node N(0) to the destination as the node N(6) is calculated.

In the speed camera searching process, the speed camera disposed at a certain unit pass of the route is searched. The route is divided into multiple unit passes, each of which is sandwiched between two adjacent nodes, and a minimum unit of the route. The certain unit pass is one of the unit passes. Thus, the apparatus 10 searches the camera at every unit pass. Assuming that the apparatus 10 searches the camera at the unit pass between the node N(1) and the node N(2), the process will be explained.

(First Step)

Figure 3:
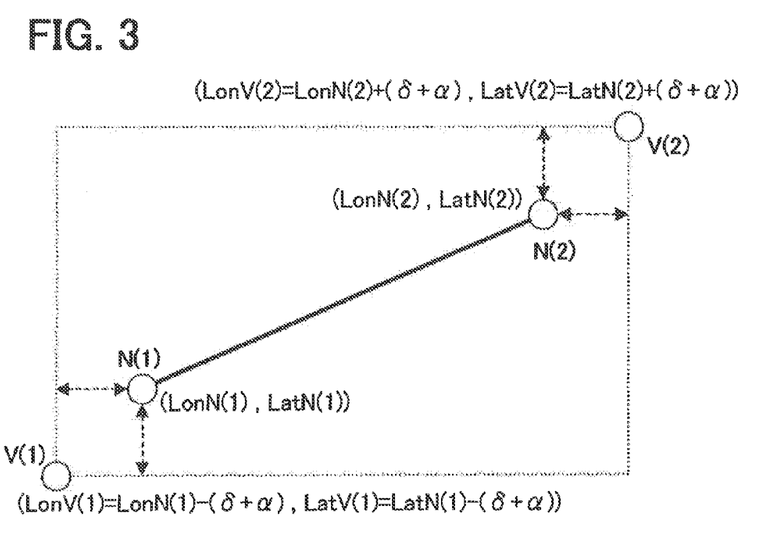
FIG. 3 is a diagram showing a relationship between a node and a virtual coordinate point.

At the first step, the apparatus confirms whether the camera exists around the unit pass between the node N(1) and the node N(2). Specifically, as shown in FIG. 3, virtual coordinate points V(1), V(2) are set with respect to the coordinates (i.e., the longitude and the latitude) of the nodes N(1), N(2), which are disposed on both ends of the unit pass, respectively, as the standard points.

The longitude of each virtual coordinate point V(1), V(2) is defined as LonV(1) and LongV(2), respectively. The longitude LonV(1), LonV(2) is calculated as follows. Here, the longitude LonN(1) represents the longitude of the node N(1), and the longitude LonN(2) represents the longitude of the node N(2).

When the longitude LonN(1) is equal to or smaller than the longitude LonN(2), i.e., when the equation of LonN(1)<=LonN(2) is established, the longitude LonV(1) and the longitude LonV(2) are obtained by the equations of:

"LonV(1)=LonN(1)−(δ+α)" and

"LonV(2)=LonN(2)+(δ+α)."

When the longitude LonN(1) larger than the longitude LonN(2), i.e., when the equation of LonN(1)>LonNV(2) is established, the longitude LonV(1) and the longitude LonV(2) are obtained by the equations of:

"LonV(1)=LonN(1)+(δ+α)" and

"LonV(2)=LonN(2)−(δ+α)."

The latitude of each virtual coordinate point V(1), V(2) is defined as LatV(1) and LatV(2), respectively. The latitude LatV(1), LatV(2) is calculated as follows. Here, the latitude LatN(1) represents the latitude of the node N(1), and the latitude LatN(2) represents the latitude of the node N(2).

When the latitude LatN(1) is equal to or smaller than the latitude LatN(2), i.e., when the equation of LatN(1)<=LatN(2) is established, the latitude LatV(1) and the latitude LatV(2) are obtained by the equations of:

"LatV(1)=LatN(1)−(δ+α)" and

"LatV(2)=LatN(2)+(δ+α)."

When the latitude LatN(1) larger than the latitude LatN(2), i.e., when the equation of LatN(1)>LatN(2) is established, the latitude LatV(1) and the latitude LatV(2) are obtained by the equations of:

"LatV(1)=LatN(1)+(δ+α)" and

"LatV(2)=LatN(2)−(δ+α)."

Thus, the virtual coordinate points V(1), V(2) are disposed on an outside of a rectangular region, which has a diagonal line with two ends of the nodes N(1), N(2), Specifically, another rectangular region having a diagonal line with two ends of the virtual coordinate points V(1), V(2) is defined as a route periphery region. The route periphery region includes the rectangular region of the nodes N(1), N(2). Thus, the virtual coordinate points V(1), V(2) are determined. As a result, the unit pass having two ends of the nodes N(1), N(2) is included in the route periphery region.

In the above equations, the variables α, δ are correction values. When the virtual coordinate points V(1), V(2) are calculated, the variables α, δ are changed according to attribution information of each unit pass, The attribution information is, for example, the road width, the number of lanes in the road, the type of the road such as a highway or an ordinary road, and the like. Thus, the searching accuracy of the speed camera is improved when the variables α, δ are changed appropriately, compared with a case where the variables α, δ are the same in all unit passes. In the present embodiment, the variable δ is a fixed value so that the variable δ is not changed. The variable α is changed according to the attribution information of the unit pass.

Figure 4:
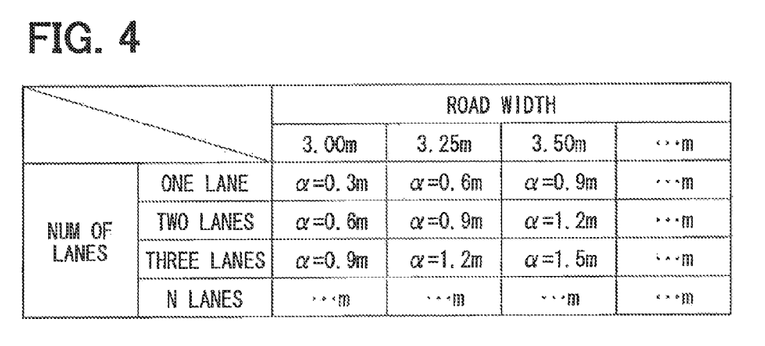
FIG. 4 is a diagram showing a correction value in accordance with the number of lanes on the road and a road width.

For example, as shown in FIG. 4, when the variable α is preliminary set according to the road width of the unit pass (i.e., the width of one lane in the road) and the number of lanes in the road, and the variable α is stored preliminary. Thus, the virtual coordinate points V(1), V(2) are calculated according to the road width and the number of lanes. In the example of FIG. 4, as the road width is broad, and as the number of lanes is large, the variable α becomes large so that the route periphery region is set to be wide.

After the virtual coordinate points V(1), V(2) are calculated, the apparatus 10 searches the camera in the route periphery region. Specifically, the apparatus 10 searches the camera having the position information in a range having the longitude between LonN(1) and LonV(2) and the latitude between LatV(1) and LatV(2) with using the speed camera database 152. Then, the apparatus retrieves the camera as a candidate of the warning object.

When the speed camera does not exist in the route periphery region, the process with respect to the current unit pass as the process object is completed, and then, it proceeds to the first step of the process with regard to the next unit pass. In this case, the first step is performed with regard to the unit pass between the node N(2) and the node N(3), When the speed camera exists in the route periphery region, it proceeds to the second step of the process.

(Second Step)

At the second step, the tilt angle θ of the line segment between the node N(1) and the node N(2) is obtained. The tilt angle θ represents a direction from the node N(1) as an entrance point of the unit pass having two ends of the nodes N(1), N(2) to the node N(2) as an exit point of the unit pass. Specifically, the tilt angle θ is an angle indicative of the driving direction of the vehicle. As described above, the north direction is the reference direction, and the angle is measured in the clockwise rotation.

Figure 5:
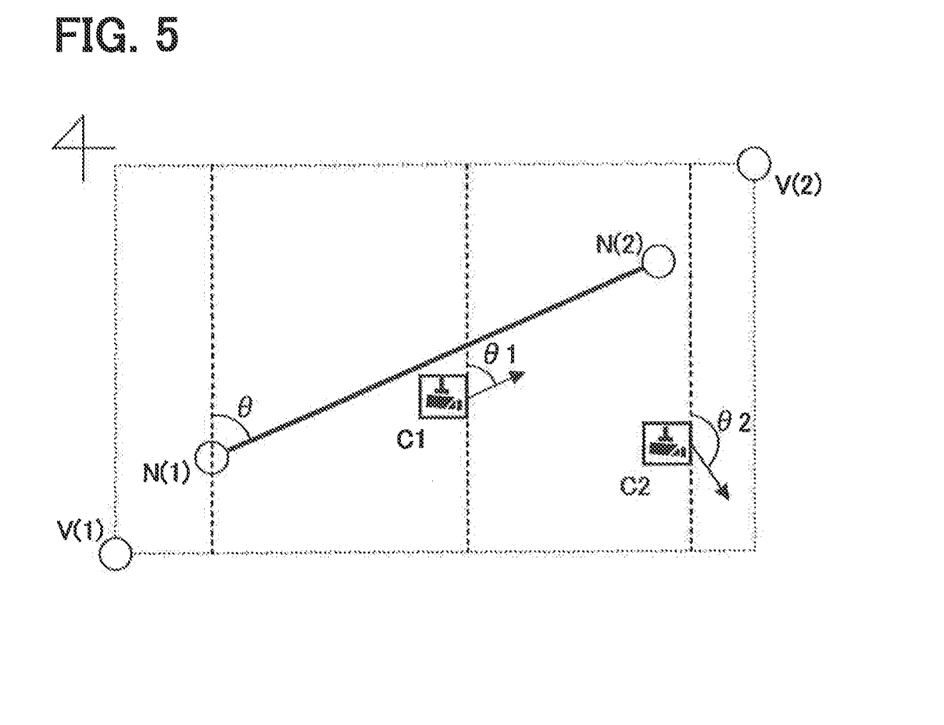
FIG. 5 is a diagram showing a relationship between a tilt angle of a line segment and an arrangement angle of a speed camera.

Next, with regard to the candidate of the warning object retrieved in the first step, the arrangement angel of the candidate stored in the speed camera database 152 is compared with the tilt angle θ of the line segment between the nodes N(1) and N(2). FIG. 5 shows an example such that two speed cameras C1, C2 are retrieved as the candidates of the warning object. The arrangement angle of each camera C1, C2 is θ1 and θ2, respectively.

When the arrangement angle of the speed camera is in a range between θ−β and θ+β, for example, when the arrangement angle is defined as θ1, and the equation of "θ−β<=θ1<=θ+β" is satisfied, the apparatus 10 determines that the speed camera is arranged to have the direction along with the driving direction of the vehicle. Here, in the present embodiment, the variable β is a fixed value, so that the variable β is preliminary set to be a certain value.

When the arrangements angle of all of the candidates of the warning object are not disposed in the range between θ−β and θ+β, the process with respect to the current unit pass as the process object is completed, and then, it proceeds to the first step of the process with regard to the next unit pass. In this case, the first step is performed with regard to the unit pass between the node N(2) and the node N(3). When the speed camera having the arrangement angle in the range between θ−β and θ+β exists, it proceeds to the third step of the process, and the speed camera having the arrangement angle out of the range between θ−β and θ+β is eliminated from the candidate of the warning object.

(Third Step)

Figure 6:
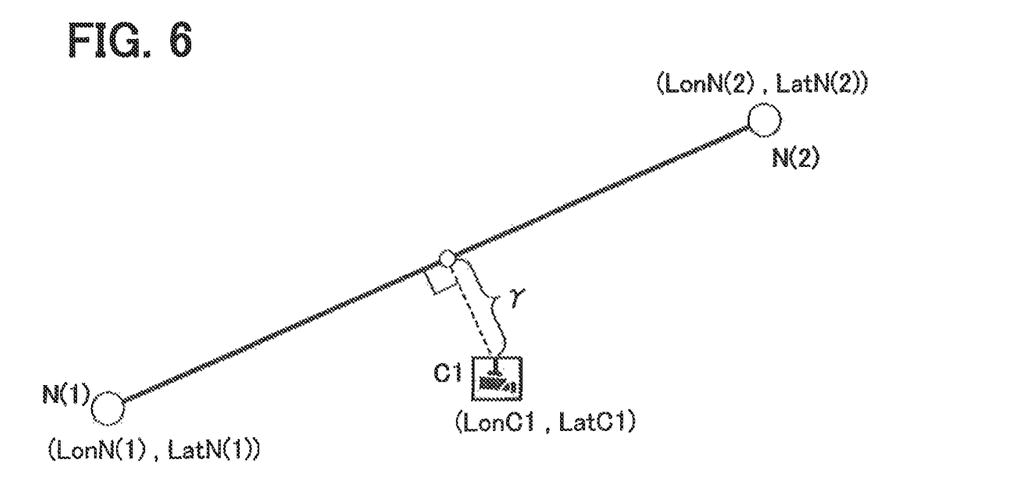
FIG. 6 is a diagram showing a distance between the line segment and the speed camera.

At the third step, with respect to each candidate of the warning object, which is narrowed at the second step, the distance γ between the camera and the line segment between the nodes N(1) and N(2) is obtained, as shown in FIG. 6. Specifically, a length of a perpendicular line segment drawn from the speed camera to be perpendicular to the line segment between nodes N(1) and N(2) is defined as the distance γ. When the distance γ is equal to or smaller than a determination reference distance L, which is preliminary set, the apparatus 10 determines that the speed camera is disposed on the unit pass. In the present embodiment, the determination reference distance L is a fixed value, so that the determination reference distance L is preliminary set to an appropriate value.

When all of the distances γ of the candidates of the warning object exceed the determination reference distance L, the process with respect to the current unit pass as the process object is completed, and then, it proceeds to the first step of the process with regard to the next unit pass. In this case, the first step is performed with regard to the unit pass between the node N(2) and the node N(3). When the camera having the distance γ equal to or smaller than the determination reference distance L exists, the speed camera having the distance γ larger than the determination reference distance L is eliminated from the candidate of the warning object, and remaining cameras are determined as the warning object. Thus, when the vehicle approaches the cameras determined as the warning object, the display 17 displays the warning icon, and the sound output element 18 outputs the warning sound. In this case, the process with respect to the current unit pass as the process object is completed, and then, it proceeds to the first step of the process with regard to the next unit pass. In this case, the first step is performed with regard to the unit pass between the node N(2) and the node N(3).

(3. Process Procedure)

Next, the process procedure of the speed camera searching process executed by the controller 19 in the navigation apparatus 10 will be explained with reference to FIG. 7. The controller 19 divides the guidance route from the guidance starting point to the destination into multiple sections, which are different from unit passes. The sections are used for deciding a group, to which the process is continuously performed. Specifically, as described later, the apparatus waits for a predetermined time interval such as a few tens seconds after the process with respect to each section is completed. Thus, the process load of the apparatus is reduced. For example, the controller 10 may divide the route into multiple sections, each of which has a predetermined distance so that the route is divided by the predetermined distance. Here, the minimum section to be divided is equal to or larger than the unit pass. Specifically, the boundary of the section is decided by the nodes.

Then, the controller 19 proceeds the process to step S102. In step S102, the controller determines whether the search of the speed camera is completed in all of the sections on the guidance route from the guidance starting point to the destination. When the controller 19 determines that there is at least one section, to which the search of the camera is not completed, i.e., when the determination in step S102 is "NO," it goes to step S103.

The controller 19 determines in step S103 whether the search of the speed camera is completed in one of the sections. Specifically, the apparatus 10 determines whether the node of the unit pass on the destination side, to which the search of the speed camera has been completed at the present time, is equal to the node of the boundary of the current section. When the controller 19 determines that the search of the speed camera is not completed in one of the sections, i.e., when the determination in step S103 is "NO," it goes to step S104. In step S104, the virtual coordinate points V(X), V(X+1) are obtained based on the coordinates of the nodes N(X), N(X+1), which are disposed on both ends of the unit pass as the process object, as shown in FIG. 3. Here, the variable X represents the node number. The initial value of the variable X is set to be zero. Specifically, the node N(0) represents the guidance starting point.

Then, the controller 19 determines whether the speed camera exists in the route periphery region having the diagonal line with two ends of the virtual coordinate points V(X), V(X+1). When the controller 19 determines that the speed camera exists in the route periphery region, i.e., when the determination in step S105 is "YES," it goes to step S106. The controller 19 retrieves all of speed cameras among the cameras stored in the speed camera database 152 as the candidates of the warning object, which are disposed in the route periphery region.

Then, the controller 19 calculates the tilt angle $\theta$ of the line segment between the node N(X) and the node N(X+1) in step S107. Further, the controller 19 determines in step S108 whether the speed camera having the arrangement angle in the range between $\theta-\beta$ and $\theta+\beta$ exists among the candidates of the warning object. When the controller 19 determines that the speed camera having the arrangement angle in the range between $\theta-\beta$ and $\theta+\beta$ exists, i.e., when the determination in step S108 is "YES," it goes to step S109. In step S109, the speed camera having the arrangement angle out of the range between $\theta-\beta$ and $\theta+\beta$ is eliminated from the candidates of the warning object.

Then, in step S110, the controller 19 calculates the distance $\gamma$ between the camera and the line segment between the nodes N(X) and N(X+1) with regard to all of speed cameras, which are the candidates of the warning object. The controller 19 determines in step S111 whether the speed camera having the distance $\gamma$ equal to or smaller than the determination reference distance L exists in the candidates of the warning object. When the controller 19 determines that the speed camera having the distance $\gamma$ equal to or smaller than the determination reference distance L exists, i.e., when the determination in step S111 is "YES," it goes to step S112. Then, in step S112, the controller 19 determines that all of speed cameras having the distance $\gamma$ equal to or smaller than the determination reference distance L are the warning objects. Specifically, the controller 19 eliminates the speed camera having the distance $\gamma$ larger than the determination reference distance L from the candidate of the warning object. Thus, in step S113, the controller 19 adds one to the variable X, and then, it goes to step S102.

When the controller 19 determines that the speed camera does not exist in the route periphery region, i.e., when the determination in step S105 is "NO," it goes to step S113. Then, in step S113, the controller 19 adds one to the variable X, and then, it goes to step S102. When the controller 19 determines that the speed camera having the arrangement angle in the range between $\theta-\beta$ and $\theta+\beta$ does not exist, i.e., when the determination in step S108 is "NO," it goes to step S113. Then, in step S113, the controller 19 adds one to the variable X, and then, it goes to step S102. When the controller 19 determines that the speed camera having the distance $\gamma$ equal to or smaller than the determination reference distance L does not exist, i.e., when the determination in step S111 is "NO," it goes to step S113. Then, in step S113, the controller 19 adds one to the variable X, and then, it goes to step S102.

When the controller 19 determines that the search of the speed camera is completed in one of the sections, i.e., when the determination in step S103 is "YES," it goes to step S114. In step S114, the controller 19 waits for a predetermined time interval such as a few tens seconds. This waiting step is performed in order to reduce the process load for executing the speed camera searching process. Specifically, the searching of the speed camera in a whole of the guidance route is not performed continuously at one time, but the searching of the speed camera is performed with process down-time therebetween. Thus, the influence to the navigation process such as a route guiding function is reduced. After the waiting step, it goes to step S104.

Figure 7:
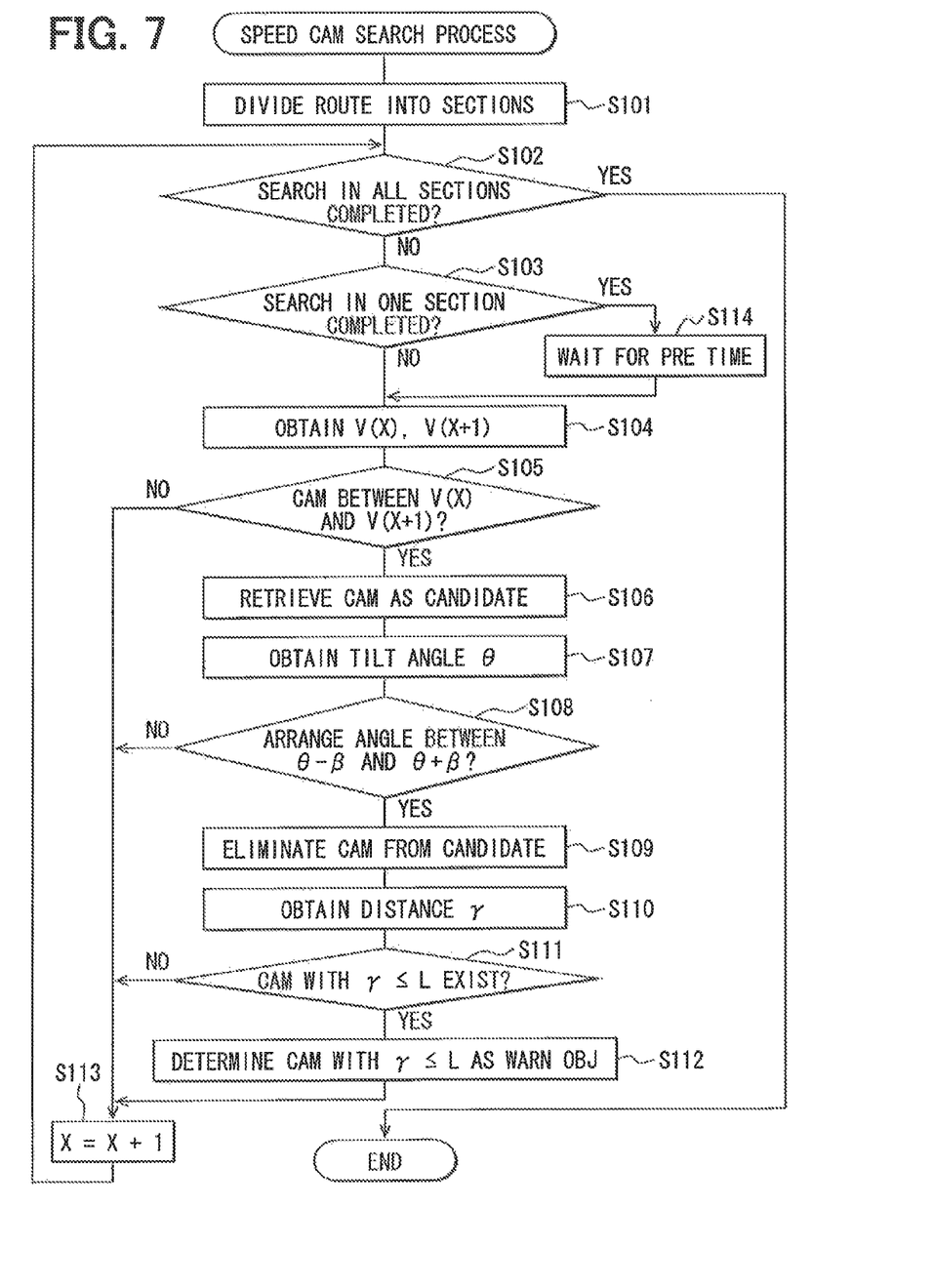
FIG. 7 is a flowchart showing a speed camera searching process.

Then, when the controller 19 determines that the search of the speed camera is completed in all of the sections on the guidance route from the guidance starting point to the destination, i.e., when the determination in step S102 is "YES," the controller 19 finishes the speed camera searching process in FIG. 7.

(4. Effects)

Thus, the navigation apparatus 10 according to the present embodiment searches the speed camera as the warning object, which is disposed on the guidance route of the vehicle among all of the speed cameras, and corresponds to the driving direction of the vehicle along the guidance route. Accordingly, based on the information in the speed camera database 152, which is independent from the map data 151, the apparatus 10 searches the speed camera as the warning object effectively, and then, notifies the driver of the information about the speed camera. Specifically, since the apparatus 10 searches the speed camera along with the guidance route, the apparatus 10 can notify the existence of the speed camera early.

The apparatus 10 sets the route periphery region including the unit pass with respect to each unit pass, which is prepared by dividing the guidance route. Further, the apparatus 10 retrieves the speed camera arranged in the route periphery region as the candidate of the warning object. Accordingly, compared with a case where a whole route periphery region including a whole of the guidance route is set at one time, a speed camera, which is not necessary to notify because the speed camera is disposed far from the guidance route, is less likely to be retrieved, As a result, the camera as the warning object is effectively retrieved.

The apparatus 10 changes the dimensions of the route periphery region according to the road attribution information of the unit pass. Specifically, when the width of the road is wide, the deviation of the arrangement place of the speed camera with respect to the road data such as the node and the link is large. Accordingly, as the road width increases, and as the number of lanes of the road increases, the route periphery region is set to be wider. Accordingly, compared with a case where the route periphery region is set without depending on the road attribution information, the speed camera, which is not necessary to notify, is less likely to be retrieved. As a result, the camera as the warning object is effectively retrieved and searched.

Further, the apparatus 10 eliminates the speed camera having the distance to the unit pass larger than the predetermined value among the speed cameras in the route periphery region from the candidate of the warning object since the speed camera is not disposed along with the guidance route. Accordingly, the camera not disposed on the guidance route is easily specified and eliminated because, for example, the camera is disposed on a different route.

The apparatus 10 eliminates the camera in the route periphery region having the arrangement angle out of the predetermined angle range, which is set based on the driving direction of the vehicle, since the camera does not correspond to the driving direction of the vehicle. Accordingly, the apparatus easily eliminates the camera not corresponding to the driving direction of the vehicle since the camera is disposed on an opposite lane, for example.

Further, the apparatus 10 specifies the direction from the entrance point to the exit point of the unit pass as the driving direction of the vehicle. Accordingly, even if it is difficult to specify the driving direction of a whole of the guidance route as one direction, the apparatus 10 can specify the driving direction of each unit pass appropriately.

The apparatus 10 divides the guidance route from the guidance starting point to the destination into multiple sections. After the search of the candidates of the warning object in all of the unit passes of a certain section is completed, and before the search of the candidates of the warning object in the unit passes of a next section is started, the apparatus waits for the predetermined time interval. Accordingly, the influence to the navigation function as a primary role is reduced.

In the present embodiment, the navigation apparatus 10 corresponds to a notification apparatus, and the memory 15 corresponds to an obtaining device. Further, steps S104 to S106 correspond to the retrieving device. Steps S107 to S109 correspond to the first eliminating device, and steps S110 to S112 correspond to the second eliminating device. Step S114 corresponds to the waiting device. The speed camera corresponds to the specific object. The warning object corresponds to the notification object. The guidance route corresponds to the driving schedule route, and the unit pass corresponds to a partial route. Two different unit passes, which are continuously connected to each other, but are disposed in different sections, correspond to the first partial route and the second partial route, respectively. The route periphery region corresponds to the partial region. A set of the route periphery regions corresponds to an inclusive region.

(Other Embodiments)

Figure 8:
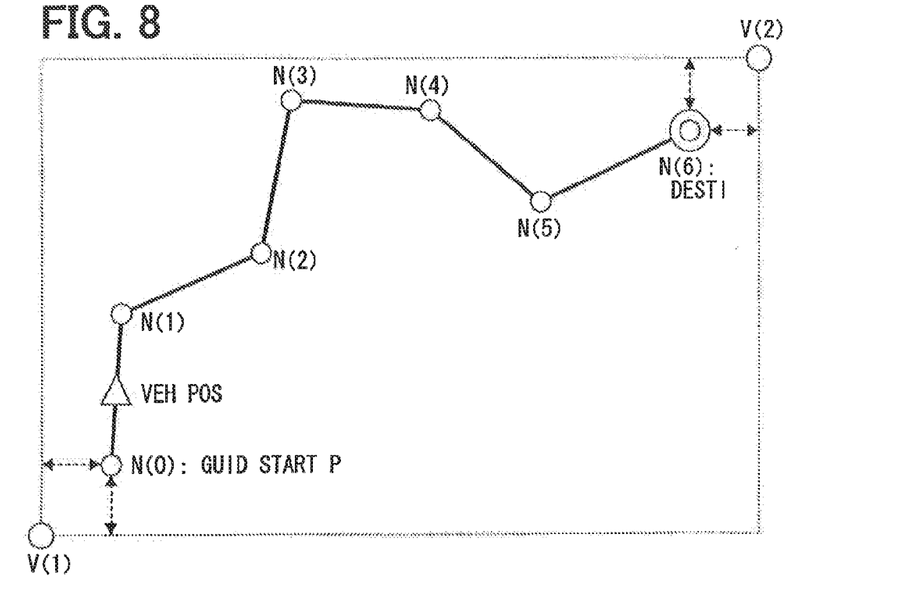
FIG. 8 is a diagram showing a virtual coordinate point set according to a guidance starting point and a destination as reference points.

In the above embodiment, the first step of the speed camera searching process is performed at each unit pass on the guidance route. Alternatively, as shown in FIG. 8, the virtual coordinate points V(1), V(2) may be set according to the node N(0) as the guidance starting point and the node N(6) as the destination. Specifically, the virtual coordinate points V(1), V(2) may be set such that the rectangular region as the route periphery region having the diagonal line with two ends of the virtual coordinate points V(1), V(2) includes the rectangular region having the diagonal line with two ends of the virtual coordinate points N(1), N(6). Thus, after the first step is executed, the second and third steps are performed at each unit pass, so that the speed camera as the warning object is searched.

Figure 9:
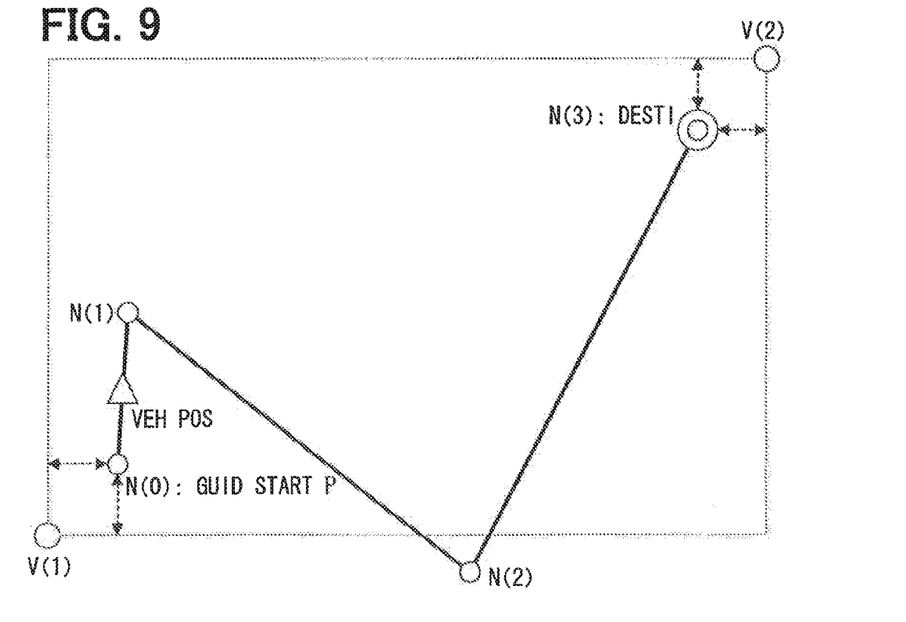
FIG. 9 is a diagram showing an example that a part of the guidance route is not disposed in a route periphery region.
Figure 10:
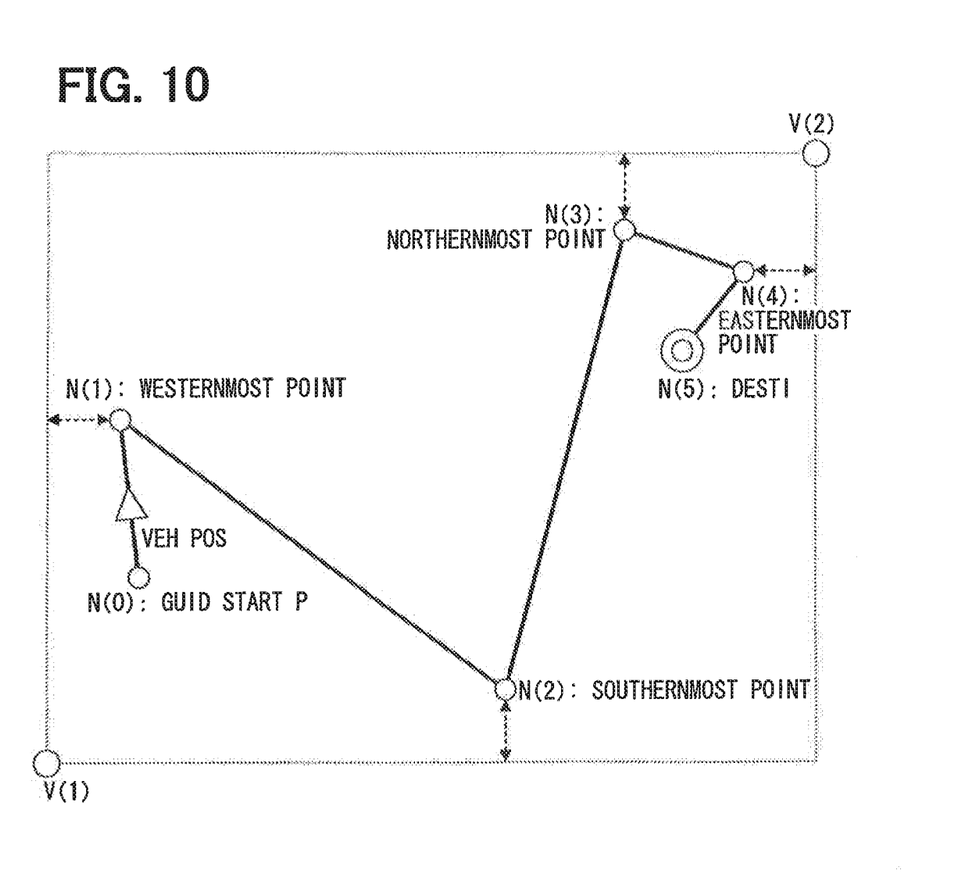
FIG. 10 is a diagram showing a virtual coordinate point according to a northernmost point, a southernmost point, a westernmost point and an easternmost point on the guidance route as reference points.

Here, in the above case, as shown in FIG. 9, a part of the guidance route may not be in the route periphery region. Thus, as shown in FIG. 10, the nodes on the guidance route corresponding to the northernmost point, the southernmost point, the westernmost point and the easternmost point are calculated. The virtual coordinate points V(1), V(2) may be set according to these nodes as standards. Specifically, the longitude and the latitude of the virtual coordinate point V(1) are set according to the longitude of the westernmost point and the latitude of the southernmost point. The longitude and the latitude of the virtual coordinate point V(2) are set according to the longitude of the easternmost point and the latitude of the northernmost point. In this case, the virtual coordinate points V(1), V(2) are set so as to include a whole of the guidance route in the route periphery region.

In the above embodiment, the variable a and the fixed value δ as the correction values are added to or subtracted from the coordinates of the node disposed at one end of the unit pass. Alternatively, only one variable may be used and added to and subtracted from the coordinates of the node. Alternatively, without using the correction value, the rectangular region having the diagonal line with two ends of the nodes disposed at both ends of the unit pass may be the route periphery region. In this case, the speed camera near the node may not be disposed in the route periphery region. Accordingly, in order to search all cameras, which are necessary to be notified, the route periphery region may be enlarged with using the correction values.

In the above embodiment, the speed camera not corresponding to the driving direction of the vehicle is eliminated from the candidate of the warning object in steps S107 to S109, and then, the speed camera not disposed on the guidance route is also eliminated from the candidate of the warning object in steps S110 to S112. Alternatively, after the speed camera not disposed on the guidance route is eliminated from the candidate of the warning object, the speed camera not corresponding to the driving direction of the vehicle may be eliminated from the candidate of the warning object. Here, the process for eliminating the speed camera not disposed on the guidance route from the candidate of the warning object may have the process load higher than the process load of the process for eliminating the speed camera not corresponding to the driving direction of the vehicle from the candidate of the warning object. In this case, in view of the process load (i.e., the calculation load), after the speed camera not corresponding to the driving direction of the vehicle is eliminated from the candidate of the warning object, the speed camera not disposed on the guidance route may be eliminated from the candidate of the warning object.

In the above embodiment, the process is performed in each unit pass, and the tile angle θ of the line segment between the nodes N(1) and N(2) disposed at both ends of the unit pass is specified as the driving direction of the vehicle. Alternatively, a part of the guidance route including three or more nodes may be a unit pass so that the unit pass includes two or more line segments, and the average of the tile angles of the line segments in the unit pass may be specified as the driving direction.

In the above embodiment, the information about the speed camera is obtained from the speed camera database 152 with using the memory 15. Alternatively, the information about the speed camera may be stored in an external device, and the information may be obtained by communicating with the external device.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A notification apparatus for notifying a passenger in a vehicle of existence of a specific object disposed on a road, the apparatus comprising:
    an information obtaining device that obtains information about a plurality of specific objects, the information including positional information indicative of a position of each specific object and angle information indicative of a direction of each specific object;
    a candidate retrieving device that: sets an inclusive region including a driving schedule route of the vehicle, which is specified by map data; and retrieves one of the specific objects in the inclusive region as a notification object candidate, according to the positional information;
    a first eliminating device that eliminates the one of the specific objects from the notification object candidate according to the angle information when the one of the specific objects does not correspond to a driving direction of the vehicle; and
    a second eliminating device that eliminates the one of the specific objects from the notification object candidate according to the positional information when the one of the specific objects is not disposed on the driving schedule route.

2. The notification apparatus according to claim 1,
    wherein the candidate retrieving device divides the driving schedule route into a plurality of partial routes,
    wherein the candidate retrieving device sets each partial region, which includes one of the partial routes,
    wherein the candidate retrieving device specifies one of the partial regions as the inclusive region, and
    wherein the candidate retrieving device retrieves the one of the specific objects arranged in the one of the partial regions as the notification object candidate.

3. The notification apparatus according to claim 2,
    wherein the candidate retrieving device changes dimensions of each partial region according to road attribution information of the partial route.

4. The notification apparatus according to claim 2,
    wherein the second eliminating device determines that the one of the specific objects is not disposed on the driving schedule route when a distance between the one of the specific objects and the one of the partial routes exceeds a predetermined value.

5. The notification apparatus according to claim 2,
    wherein the first eliminating device determines that the one of the specific objects does not corresponding to the driving direction when the direction of the one of the specific objects is not disposed within a predetermined angle range, and
    wherein the predetermined angle range is set according to the driving direction of the vehicle disposed on the one of the partial routes.

6. The notification apparatus according to claim 5,
    wherein the first eliminating device specifies the driving direction to be equal to a direction from an entrance point to an exit point of the one of the partial routes.

7. The notification apparatus according to claim 2, further comprising:
    a waiting device,
    wherein the partial routes includes a first partial route and a second partial route, which are continuously connected to each other,
    wherein the waiting device waits for a predetermined time interval after the notification apparatus completes to search a notification object in the first partial route and before the notification apparatus starts to search the notification object in the second partial route.

8. The notification apparatus according to claim 1,
    wherein the second eliminating device eliminates the one of the specific objects, not disposed on the driving schedule route, from the notification object candidate after the first eliminating device eliminates the one of the specific objects, not corresponding to the driving direction, from the notification object candidate.

9. The notification apparatus according to claim 1,
    wherein the first eliminating device eliminates the one of the specific objects, not corresponding to the driving direction, from the notification object candidate after the second eliminating device eliminates the one of the specific objects, not disposed on the driving schedule route, from the notification object candidate.

10. The notification apparatus according to claim 1,
    wherein the specific objects are speed cameras.

* * * * *